(12) United States Patent
Nonaka et al.

(10) Patent No.: US 8,956,091 B2
(45) Date of Patent: Feb. 17, 2015

(54) DRILLING TOOL

(75) Inventors: Takuma Nonaka, Tokyo (JP); Terufumi Hamano, Tokyo (JP); Michio Yamashita, Tokyo (JP)

(73) Assignee: Max Co., Ltd., Tokyo (JP)

( * ) Notice: Subject to any disclaimer, the term of this patent is extended or adjusted under 35 U.S.C. 154(b) by 952 days.

(21) Appl. No.: 12/669,989

(22) PCT Filed: Aug. 26, 2008

(86) PCT No.: PCT/JP2008/065205
§ 371 (c)(1),
(2), (4) Date: Jan. 21, 2010

(87) PCT Pub. No.: WO2009/031438
PCT Pub. Date: Mar. 12, 2009

(65) Prior Publication Data
US 2010/0189523 A1    Jul. 29, 2010

(30) Foreign Application Priority Data
Sep. 6, 2007   (JP) ................. 2007-231293

(51) Int. Cl.
*B23B 31/11* (2006.01)
*B23B 51/12* (2006.01)
*B23B 51/00* (2006.01)

(52) U.S. Cl.
CPC ............. *B23B 51/12* (2013.01); *B23B 31/11* (2013.01); *B23B 51/00* (2013.01); *B23B 2226/75* (2013.01); *B23B 2251/02* (2013.01); *B23B 2260/138* (2013.01); *B23B 2270/12* (2013.01); *B23B 2270/58* (2013.01)

USPC ...................... 408/239 R; 408/233

(58) Field of Classification Search
CPC .. B23C 2210/02; B23C 5/10; B23C 2240/32; B23B 31/11; B23B 2251/02; E21B 17/042; E21B 17/043
USPC ...... 408/239 A, 238, 239 R, 233, 226; 279/8; 409/234, 232
See application file for complete search history.

(56) References Cited

U.S. PATENT DOCUMENTS

| | | | | |
|---|---|---|---|---|
| 829,633 | A | * | 8/1906 | Decker .......................... 175/412 |
| 3,053,118 | A | * | 9/1962 | Lavallee ....................... 76/108.1 |
| 3,586,353 | A | * | 6/1971 | Lorenz et al. ................. 285/334 |

(Continued)

FOREIGN PATENT DOCUMENTS

| | | |
|---|---|---|
| DE | 10114240 A1 | 1/2003 |
| DE | 10 2005 055 098 A1 | 6/2007 |

(Continued)

OTHER PUBLICATIONS

Japanese Office Action issued Oct. 19, 2011 in Japanese Application No. 2007-231293 with partial English language translation.

*Primary Examiner* — Eric A Gates
*Assistant Examiner* — Paul M Janeski
(74) *Attorney, Agent, or Firm* — Drinker Biddle & Reath LLP

(57) ABSTRACT

In a drilling tool including: a shank located at a tip side of a tool main body; and a bit located at a tip side of the shank, the shank and the bit (connection body) are connected to each other via screws, and a guide part for center alignment for aligning the centers of the shank and the bit is formed in the vicinity of screw portions of the shank and the bit.

11 Claims, 16 Drawing Sheets

(56) References Cited

U.S. PATENT DOCUMENTS

| | | | |
|---|---|---|---|
| 4,850,759 A * | 7/1989 | Strand et al. | 408/239 A |
| 5,114,286 A * | 5/1992 | Calkins | 408/226 |
| 5,695,304 A * | 12/1997 | Ebert | 408/227 |
| 5,899,642 A * | 5/1999 | Berglow et al. | 407/40 |
| 5,971,670 A * | 10/1999 | Pantzar et al. | 407/34 |
| 6,234,729 B1 * | 5/2001 | Cook | 408/226 |
| 6,382,885 B2 * | 5/2002 | Isaksson | 408/239 A |
| 6,966,393 B2 * | 11/2005 | Brady | 175/393 |
| 7,341,409 B2 * | 3/2008 | Jonsson et al. | 408/233 |
| 7,713,004 B2 * | 5/2010 | Lehto et al. | 407/33 |
| 7,753,628 B2 * | 7/2010 | Hecht et al. | 408/233 |
| 2003/0210963 A1 * | 11/2003 | Kakai et al. | 408/231 |
| 2006/0073744 A1 * | 4/2006 | Jonsson et al. | 439/884 |

FOREIGN PATENT DOCUMENTS

| | | |
|---|---|---|
| EP | 1 419 839 A1 | 5/2004 |
| JP | 58-66608 | 4/1983 |
| JP | 2002-120218 | 4/2002 |
| JP | 2004-1111 | 1/2004 |
| JP | 2004-160624 | 6/2004 |
| JP | 2007-30045 | 2/2007 |

* cited by examiner

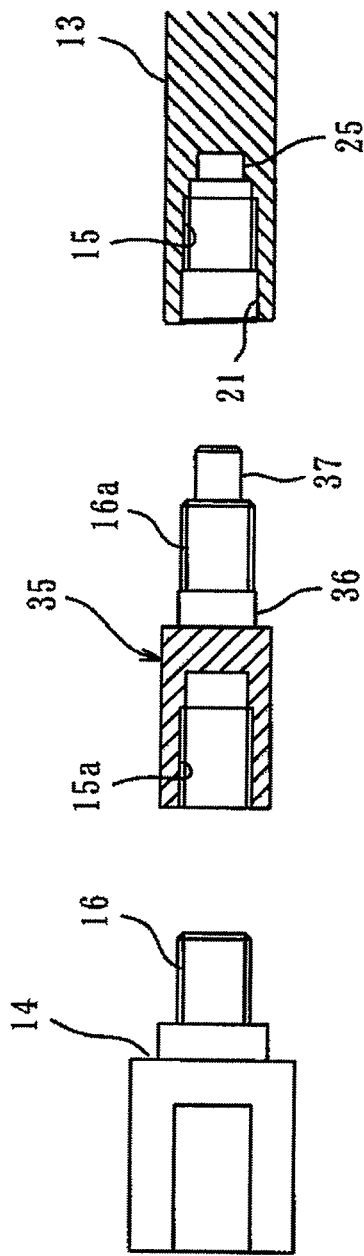
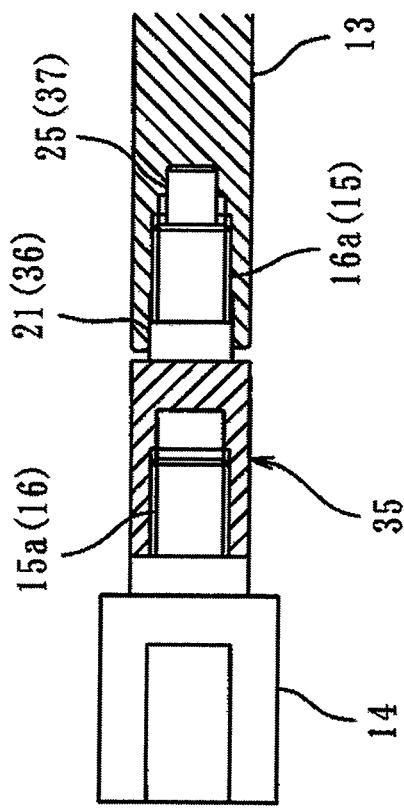
FIG. 15A
FIG. 15B

DRILLING TOOL

TECHNICAL FIELD

The present invention relates to a drilling tool for drilling a hole in concrete, mortar, block, etc.

BACKGROUND ART

For example, when an outdoor unit of an air conditioner is attached to a concrete wall, a hole is first drilled in the concrete wall, an anchor is attached to this pilot hole, and the outdoor unit is screwed and fixed to the anchor.

A shank is attached to a tip of a drilling tool for forming such a pilot hole, and a bit is provided at a tip of the shank. Further, the bit is rotated, and its tip is pressed against concrete, thereby drilling a hole while cutting contact portions of the concrete. The bit will be worn out in the course of repetition of drilling operations, and will therefore need replacement. A conventional bit has been integrally formed with a shank, but a shank part does not have to be replaced in a normal situation. Currently, there is provided a structure in which a shank and a bit are separately formed and the bit is connected to the shank via screws, thus allowing only the bit to be attached/detached to/from the shank (JP-A-2007-30045). Therefore, when the bit is worn out, it is only necessary to replace only the bit, and the shank does not have to be replaced. Hence, the cost for replacement can be kept at a low level. It is to be noted that the shank is attachable/detachable to/from a main body shaft at a tip of a tool main body via a screw connection, and is normally detached from the tool main body during a non-use period.

Actually, in the structure in which the shank and bit are connected to each other via screws in this manner, a deviation might occur between an axial center of the shank and that of the bit. If the axial centers of the shank and bit do not coincide with each other, the bit deflects in a manner that creates a conical shape while being rotated with respect to the shank, and therefore, the tip of the bit is moved around its rotation axis in a swiveling manner. Consequently, drilling efficiency is reduced, and the hole diameter of a pilot hole becomes greater than the diameter of the bit. Hence, there occurs a problem that the strength of anchor attachment is degraded. It should be noted that a similar problem also occurs when a screw connection is made between a shank and a main body shaft of a tool main body.

Therefore, the center alignment of a shank and a bit is carried out by screwing of screw portions. By tightening the screw portions, the center alignment is enabled. Furthermore, the perpendicularity of shafts is provided by an abutting surface of one of the shafts. More specifically, an end face of a front-end tubular region of a female screw portion is abutted against a bearing surface of a base of a male screw portion, thereby providing the perpendicularity. The center alignment and perpendicularity are also provided similarly when a screw connection is made between the shank and the main body shaft of the tool main body.

A slight gap exists between the male screw portion and the female screw portion, and this gap is inevitable since it is necessary for screw tightening and loosening. However, when a gap exists between the shank and bit, a deviation might occur between the axial center of the shank and that of the bit. If the axial centers of the shank and bit do not coincide with each other, the bit deflects while being rotated when the axial center of the shank and its rotation axis coincide with each other, and therefore, the tip of the bit is moved around its rotation axis in a swiveling manner. Accordingly, drilling efficiency is reduced, and the hole diameter of a pilot hole becomes greater than the diameter of the bit. Hence, there occurs a problem that the strength of anchor attachment is degraded. It should be noted that a similar problem also occurs when a screw connection is made between the shank and the main body shaft of the tool main body.

However, when the shafts are connected to each other via screws, a slight gap is needed between the male screw portion and female screw portion, and therefore, the center alignment is dependent on screw accuracy. Further, the abutting surfaces of the shafts are located outwardly, and are thus susceptible to disturbances such as flaws. Therefore, there were problems that the processing accuracy of screws has to be ensured and the accuracy of the abutting surfaces needs to be maintained.

DISCLOSURE OF THE INVENTION

One or more embodiments of the present invention provide a drilling tool capable of easily and reliably carrying out center alignment of a shank and a bit or a shank and a tool main body without maintaining the processing accuracy of screws or the accuracy of abutting surfaces.

According to a first aspect of the present invention, a drilling tool includes: a tool main body; a shank located at a tip side of the tool main body; and a connection body located at a tip side of the shank, wherein the shank and the connection body are connected via screws, and wherein a guide part for center alignment for aligning centers of the shank and the connection body is formed in the vicinity of screw portions of the shank and the connection body.

According to a second aspect of the present invention, in the drilling tool, the connection body is a bit.

According to a third aspect of the present invention, in the drilling tool, the connection body is a main body shaft.

According to a fourth aspect of the present invention, in the drilling tool, the connection body is an adaptor.

According to a fifth aspect of the present invention, in the drilling tool, the guide part includes a fitting portion and a fitted portion, which are axially fitted to each other.

According to a sixth aspect of the present invention, in the drilling tool, a plurality of the guide parts are formed.

According to a seventh aspect of the present invention, in the drilling tool, an abutting portion for restricting a depth of a screw connection is formed in the guide part.

According to an eighth aspect of the present invention, in the drilling tool, an inclined plane is provided at an end face of the shank, at which the shank is connected to a bit.

According to a ninth aspect of the present invention, in the drilling tool, an inclined plane is provided at an end face of the shank, which is located adjacent to a main body shaft.

According to a tenth aspect of the present invention, in the drilling tool, an inclined plane is provided at an end face of the adaptor, at which the adaptor is connected to a bit.

According to an eleventh aspect of the present invention, in the drilling tool, an inclined plane is provided at an end face of the adaptor, which is located adjacent to a main body shaft.

According to the first aspect of the present invention, the shank and the connection body are connected via screws, and the guide part for center alignment for aligning the centers of the shank and the connection body is formed in the vicinity of the screw portions of the shank and the connection body; thus, even if the processing accuracy of the screw portions of the connection body and the shank is not high, the center alignment is enabled easily and accurately. Accordingly, perpendicularity, which has conventionally been provided at an abutting end face, does not have to be provided.

According to the second to fourth aspects of the present invention, since the connection body is provided by the bit, the main body shaft or the adaptor, the center alignment is enabled easily and accurately even if the processing accuracy of the screw portions of the bit and shank, the main body shaft and shank or the adaptor and shank is not high. Accordingly, perpendicularity, which has conventionally been provided at an abutting end face, does not have to be provided.

According to the fifth aspect of the present invention, since the guide part includes the fitting portion and fitted portion, which are axially fitted to each other, screwing of male and female screw portions also axially proceeds. Hence, the center alignment is easily carried out because the fitting portion and fitted portion are fitted to each other automatically by screwing.

According to the sixth aspect of the present invention, a plurality of the guide parts are formed, and therefore, the accuracy of center alignment is increased.

According to the seventh aspect of the present invention, since the bit is abutted against the shank via the abutting portion, the depth of the screw connection is restricted, and screw tightening is appropriately kept. Hence, the bit will not be relatively rotated with respect to the shank, thus preventing the screwing from proceeding more than necessary.

According to the eighth to eleventh aspects of the present invention, since the inclined plane is provided at the end face, concrete cuttings in a gap at the end face can be discharged to outside.

Other features and effects are apparent from the description of embodiments and appended claims.

BRIEF DESCRIPTION OF THE DRAWINGS

[FIG. 15A] A partial cross section illustrating the shank, adaptor and bit.

[FIG. 15B] A partial cross section illustrating a connected state of the shank, adaptor and bit.

BEST MODE FOR CARRYING OUT THE INVENTION

Figure 1:
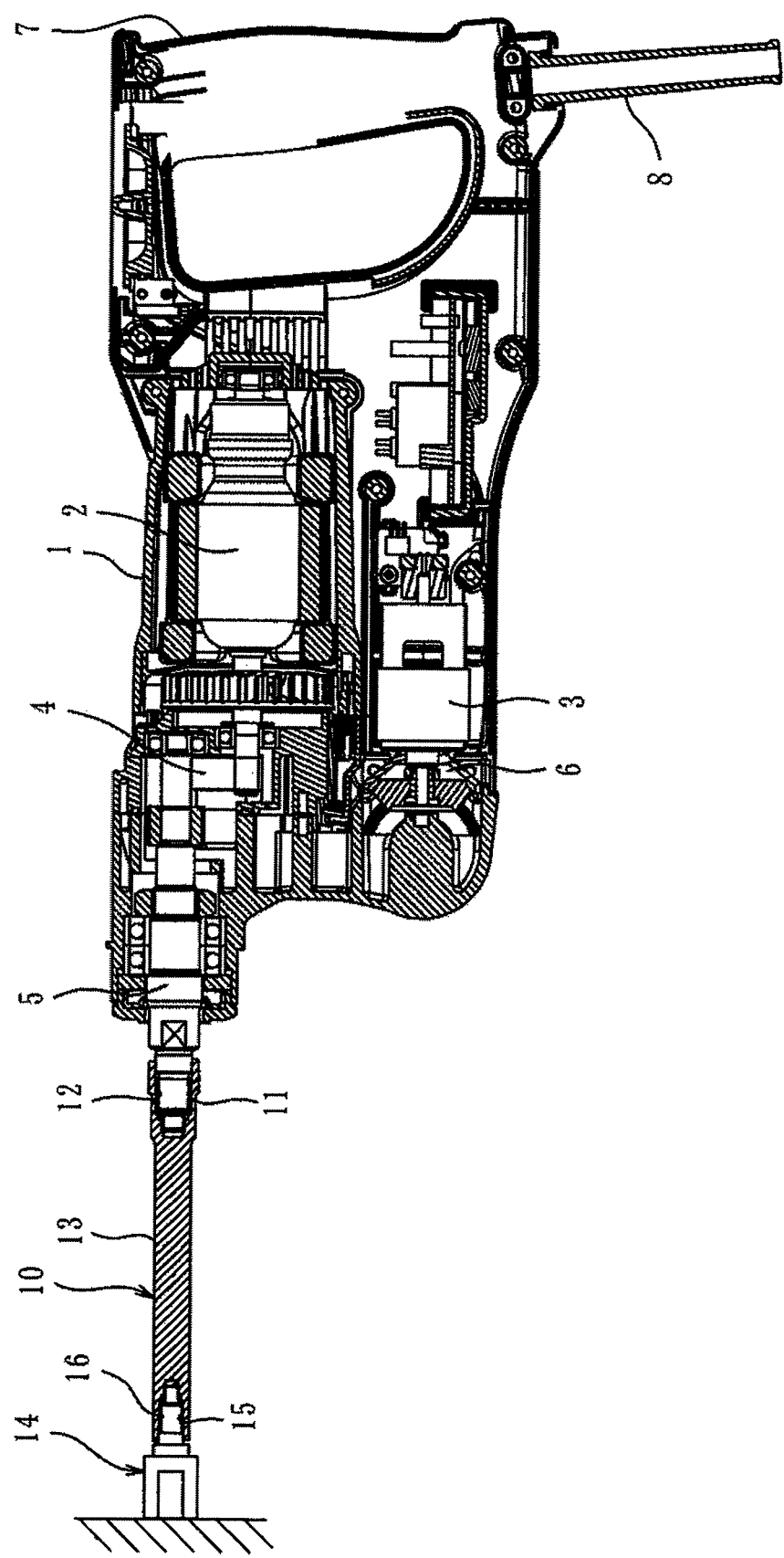
[FIG. 1] A longitudinal cross-sectional view of principal parts of a concrete drill according to the present invention.

FIG. 1 is a longitudinal cross-sectional view of a drilling tool (concrete drill) according to the present invention in which a drill bit is used. In FIG. 1, the reference numeral 1 denotes a tool main body. A first motor 2 and a second motor 3 are disposed inside the tool main body 1, and an output shaft of the first motor 2 is connected to a main body shaft 5 provided at a front end of the tool main body 1, in an inter-meshing manner via a reduction gear 4, while the second motor 3 is connected to a vibration device 6 in an operable manner. A grip 7 is integrally provided in a rear part of the tool main body 1, and a feeder code 8, through which electric power is supplied to the foregoing two motors 2 and 3, is connected to an end of the grip 7.

At a tip of the main body shaft 5, a drill bit 10 is provided so as to be connectable thereto, and a male screw portion 11 is formed at a front end of the main body shaft 5, while a female screw portion 12 is formed at a rear end of the drill bit 10.

Figure 2A:
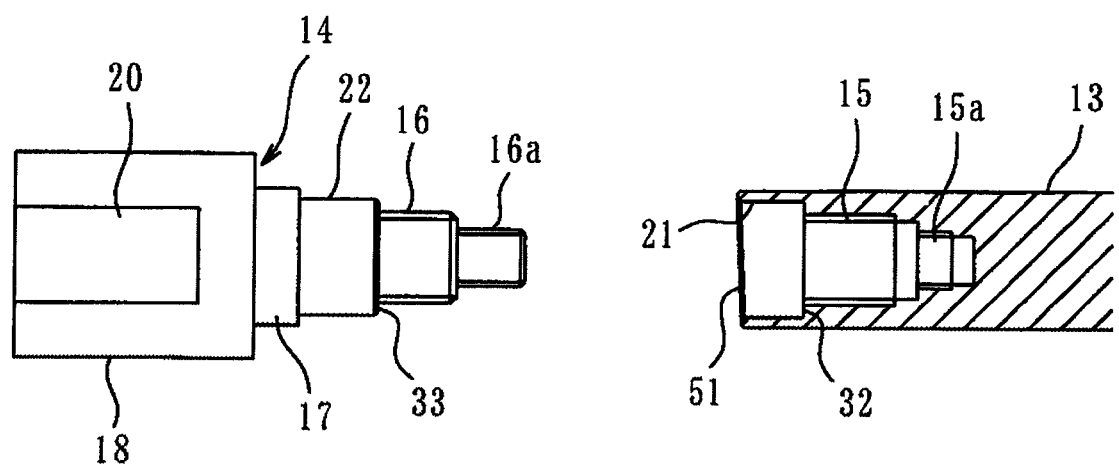
[FIG. 2A] A partial cross-sectional view illustrating a shank and a bit.
Figure 2B:
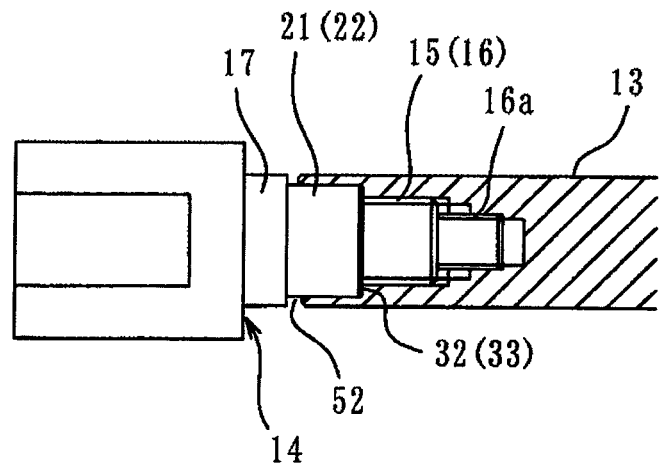
[FIG. 2B] A partial cross-sectional view illustrating a connected state of the shank and bit.

The drill bit 10 includes a shank 13 and a bit 14 which are connectable to each other via screws. At a front end of the shank 13, a female screw portion 15 is formed. On the other hand, as illustrated in FIG. 2A, the bit 14 includes: a base 17 made of iron; and a diamond grindstone body 18 fixed onto the base 17. At a part of the base 17 opposite to the grindstone body 18, a male screw portion 16 is formed, and as illustrated in FIG. 2B, the male screw portion 16 is formed so as to be able to be screwed to the female screw portion 15 at a rear end of the shank 13.

It should be noted that the diamond grindstone body 18 is formed into a columnar shape having a concave cut-out portion 20 opened to one side, and is normally a sintered body obtained by mixing and sintering metal bonded grains and diamond grains. The concave cut-out portion 20 is a portion for discharging, to outside, concrete cuttings that have been cut out mainly during drilling, and is normally formed into a sector shape in cross section but does not necessarily have to be formed into a sector shape.

When the bit 14 serving as an example of a connection body is connected to the shank 13, the male screw portion 16 of the bit 14 may be screwed into the female screw portion 15 of the shank 13.

Actually, a guide part for center alignment for aligning the centers (rotation centers) of the shank 13 and bit 14, and an abutting portion are formed in the vicinity of the screw portions of the shank 13 and bit 14.

Specifically, as illustrated in FIG. 2A, the guide part for center alignment includes: a short tubular portion 21 (fitted portion) having a circular cross section and formed in front of the female screw portion 15 of the shank 13; and a base shaft portion 22 formed at a base of the male screw portion 16 of the bit 14. The short tubular portion 21 and the base shaft portion 22 are formed so as to be fitted to each other. The short tubular portion 21 is formed so that its center coincides with the axial center of the shank 13, and the base shaft portion 22 is also formed so that its center coincides with the axial center of the bit 14.

Next, when the bit 14 is connected to the shank 13, the male screw portion 16 and a second male screw portion 16a of the bit 14 are screwed into the female screw portion 15 and a second female screw portion 15a of the shank 13 as illustrated in FIG. 2B. As the screwing proceeds, the base shaft portion 22 of the bit 14 is fitted to the short tubular portion 21 of the shank 13, the center alignment is carried out at this point. Then, a step 33 (abutting portion) between the male screw portion 16 and the base shaft portion 22 of the bit 14 is eventually abutted against a step 32 (abutting portion) between the female screw portion 15 and the short tubular portion 21 of the shank 13.

As described above, the base shaft portion 22 of the bit 14 is fitted to the short tubular portion 21 of the shank 13 to carry out center alignment, and therefore, the center alignment is enabled easily, reliably and accurately even if the processing accuracy of the male screw portion 16 and second male screw portion 16a of the bit 14 and the female screw portion 15 and second female screw portion 15a of the shank 13 is not high. Accordingly, perpendicularity, which has conventionally been provided, does not have to be provided.

It should be noted that since the bit 14 is abutted against the shank 13 via the abutting portion, the depth of a screw connection is restricted, and screw tightening is appropriately kept. Hence, when the bit 14 is relatively rotated with respect to the shank 13 during a drilling operation, the screwing can be prevented from proceeding more than necessary. The same goes for the following embodiments.

Further, an inclined plane 51 is provided at an end face of the shank 13, at which the shank 13 is connected to the bit 14, thus forming an inclined gap 52 between the inclined plane 51 of the shank 13 and the base 17 of the bit 14 as illustrated in FIG. 2B when the shank 13 and the bit 14 are connected to each other. Thus, in particular, concrete cuttings are likely to get into a gap between the shank 13 and the bit 14 during drilling, and might clog this gap and adhere thereto, which might prevent the shank 13 and the bit 14 to be attached/detached to/from each other. However, concrete cuttings can be spontaneously discharged to outside during rotation due to the shape of the inclined gap 52.

Then, the guide part for center alignment and the abutting portion are not limited to the above-described embodiment. Next, other embodiments will be described.

Figure 3A:
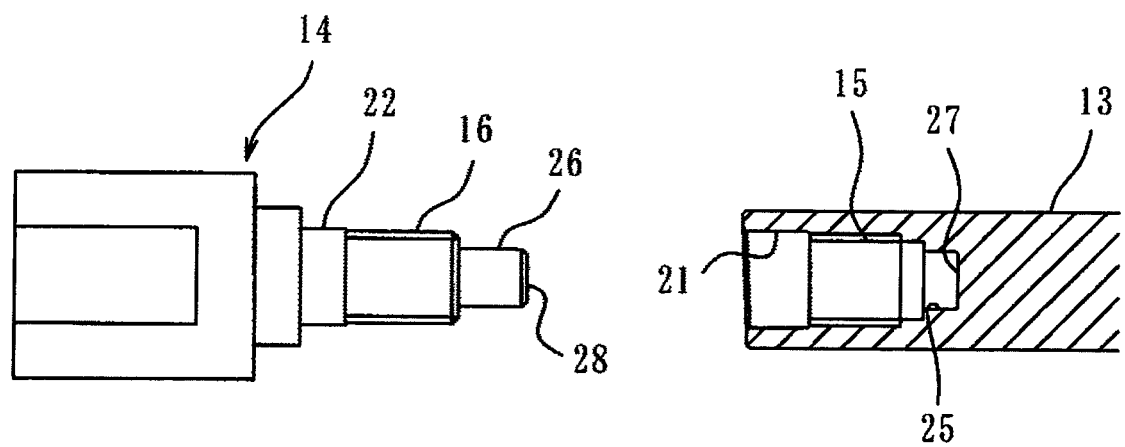
[FIG. 3A] A partial cross-sectional view illustrating the shank and bit in another embodiment.

In FIG. 3A, the guide part for center alignment includes two guide parts. Specifically, a first guide part includes: a short tubular portion 21 having a circular cross section and formed in front of the female screw portion 15 of the shank 13; and a base shaft portion 22 formed at a base of the male screw portion 16 of the bit 14. The short tubular portion 21 and the base shaft portion 22 are formed so as to be fitted to each other. The short tubular portion 21 is formed so that its center is coaxial with the axial center of the shank 13, and the base shaft portion 22 is also formed so that its center is coaxial with the axial center of the bit 14.

A second guide part includes: a concave portion 25 having a circular cross section and formed at the center of a bottom face of the female screw portion 15 at a front end of the shank 13; and a shaft-like portion 26 formed at a front end of the male screw portion 16 of the bit 14. Further, the female screw portion 15, the short tubular portion 21 and the concave portion 25 of the shank 13 are formed so as to be coaxial with the axial center of the shank 13, and the male screw portion 16, the base shaft portion 22 and the shaft-like portion 26 of the bit 14 are formed so as to be coaxial with the axial center of the bit 14.

Moreover, an abutting portion includes: a bottom face 27 of the concave portion 25 of the shank 13; and a front end 28 of the shaft-like portion 26 of the bit 14.

Figure 3B:
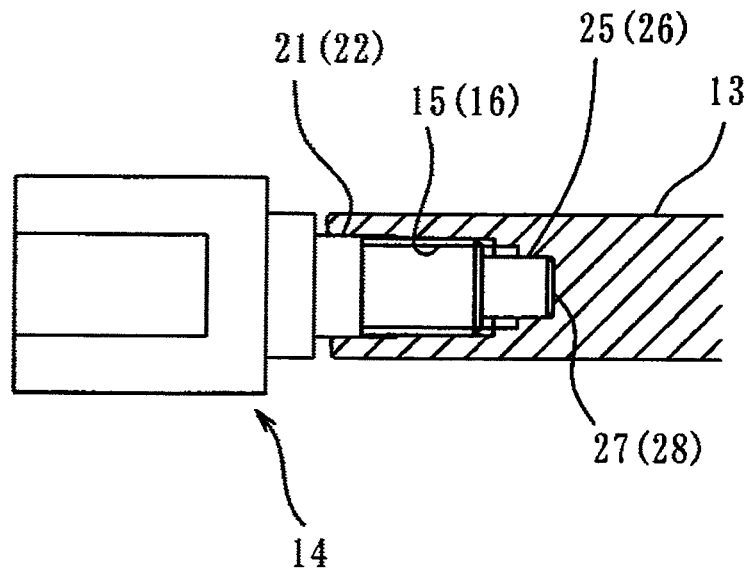
[FIG. 3B] A partial cross-sectional view illustrating a connected state of the shank and bit in another embodiment.

Next, when the bit 14 is connected to the shank 13, the male screw portion 16 of the bit 14 is screwed into the female screw portion 15 of the shank 13 as illustrated in FIG. 3B. As the screwing proceeds, the base shaft portion 22 of the bit 14 is fitted to the short tubular portion 21 of the shank 13. Similarly, the shaft-like portion 26 of the bit 14 is fitted to the concave portion 25 of the shank 13. In this manner, center alignment is carried out by means of the first guide part and the second guide part. Then, the front end 28 of the second male screw portion 16a is eventually abutted against the bottom face 27 of the concave portion 25 of the shank 13.

In the above-described embodiment, since the center alignment of the bit 14 is carried out by the first guide part and the second guide part, the accuracy of the center alignment is further increased.

Figure 4:
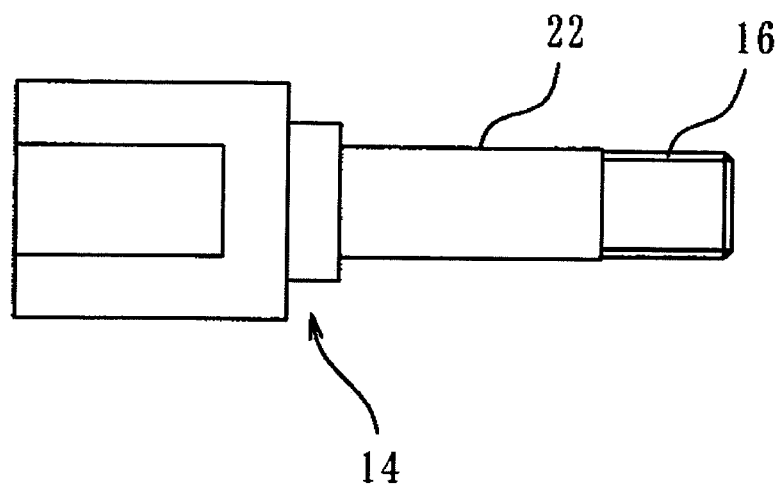
[FIG. 4] A side view of the bit in other embodiment.

It should be noted that as the guide parts are elongated like the base shaft portion 22 of the bit 14 illustrated in FIG. 4 and the short tubular portion of the shank (not illustrated), the accuracy of the center alignment is increased accordingly.

Figure 5A:
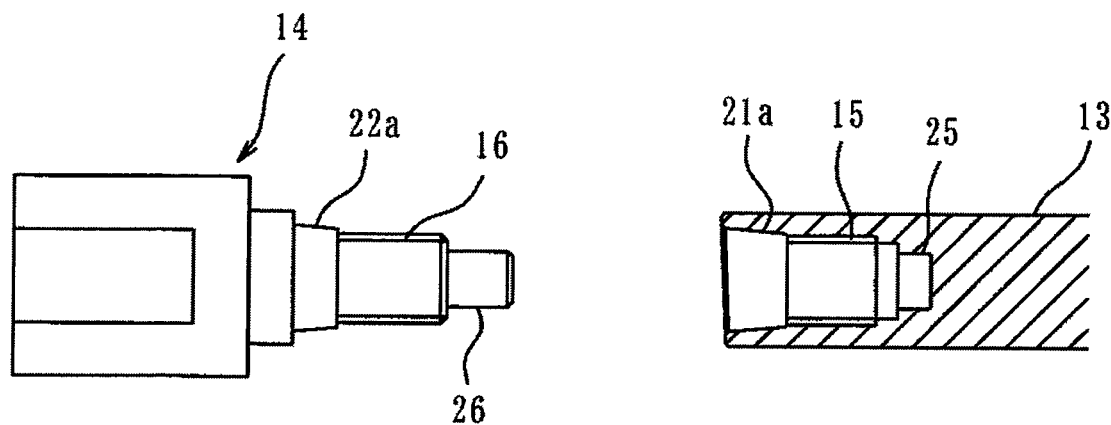
[FIG. 5A] A partial cross-sectional view illustrating the shank and bit in still another embodiment.

Next, FIG. 5A also illustrates an embodiment in which the guide part for center alignment includes two guide parts, but a first guide part includes: a bowl-like short tubular portion 21a formed in front of the female screw portion 15 of the shank 13; and a tapered base shaft portion 22a formed at a base of the male screw portion 16 of the bit 14. The short tubular portion 21a and the base shaft portion 22a are formed so as to be fitted to each other. The short tubular portion 21a is formed so that its center is coaxial with the axial center of the shank 13, and the tapered base shaft portion 22a is formed so that its center is coaxial with the axial center of the bit 14.

Furthermore, a second guide part includes: a concave portion 25 having a circular cross section and formed at the center of a bottom face of the female screw portion 15 at a front end of the shank 13; and a shaft-like portion 26 formed at a front end of the male screw portion 16 of the bit 14. The concave portion 25 and the shaft-like portion 26 are formed so as to be fitted to each other. The concave portion 25 is formed so that its center is coaxial with the axial center of the shank 13, and the shaft-like portion 26 is also formed so that its center is coaxial with the axial center of the bit 14.

Moreover, an abutting portion includes: the short tubular portion 21a of the shank 13; and the tapered base shaft portion 22a of the bit 14.

Figure 5B:
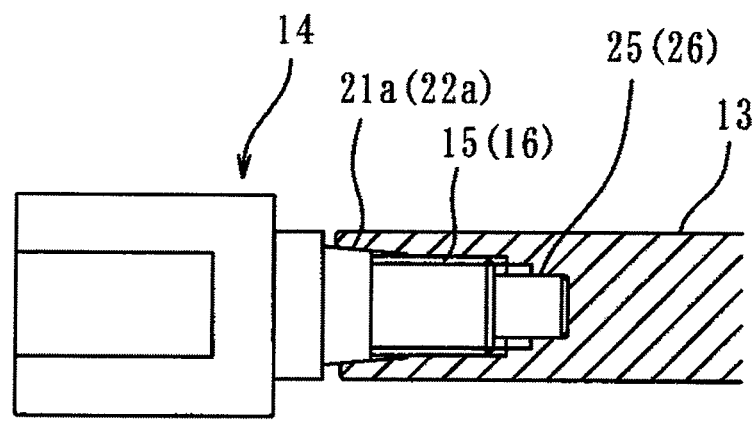
[FIG. 5B] A partial cross-sectional view illustrating a connected state of the shank and bit in still another embodiment.

When the bit 14 is connected to the shank 13, the male screw portion 16 of the bit 14 is screwed into the female screw portion 15 of the shank 13 as illustrated in FIG. 5B. As the screwing proceeds, the tapered base shaft portion 22a of the bit 14 is fitted to the short tubular portion 21a of the shank 13. Similarly, the shaft-like portion 26 of the bit 14 is fitted to the concave portion 25 of the shank 13. In this manner, center alignment is carried out by means of the first guide part and the second guide part. Then, the tapered surface of the tapered base shaft portion 22a is eventually fitted to and abutted against the short tubular portion 21a of the shank 13.

Also in the above-described embodiment, since the center alignment of the bit 14 is carried out by the first guide part and the second guide part, the accuracy of the center alignment is further increased.

Figure 6A:
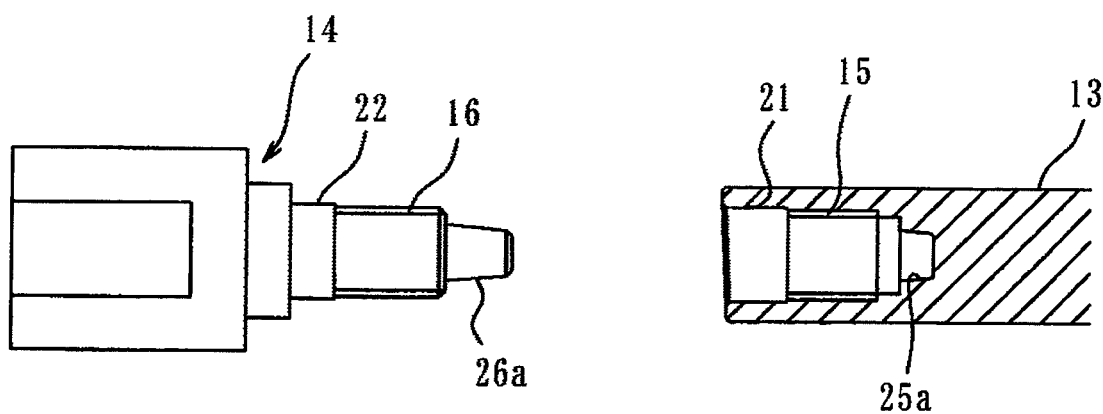
[FIG. 6A] A partial cross-sectional view illustrating the shank and bit in yet another embodiment.

Moreover, FIG. 6A also illustrates an embodiment in which the guide part for center alignment includes two guide parts. A first guide part includes: a short tubular portion 21 formed in front of the female screw portion 15 of the shank 13; and a base shaft portion 22 formed at a base of the male screw portion 16 of the bit 14. The short tubular portion 21 and the base shaft portion 22 are formed so as to be fitted to each other. The short tubular portion 21 is formed so that its center is coaxial with the axial center of the shank 13, and the base shaft portion 22 is formed so that its center is coaxial with the axial center of the bit 14.

Furthermore, a second guide part includes: a bowl-like concave portion 25a formed at the center of a bottom face of the female screw portion 15 at a front end of the shank 13; and a tapered shaft-like portion 26a formed at a front end of the male screw portion 16 of the bit 14. The concave portion 25a and the tapered shaft-like portion 26a are formed so as to be fitted to each other. The concave portion 25a is formed so that its center coincides with the axial center of the shank 13, and the shaft-like portion 26a is also formed so that its center coincides with the axial center of the bit 14.

Moreover, an abutting portion includes: the concave portion 25a of the shank 13; and the tapered shaft-like portion 26a of the bit 14.

Figure 6B:
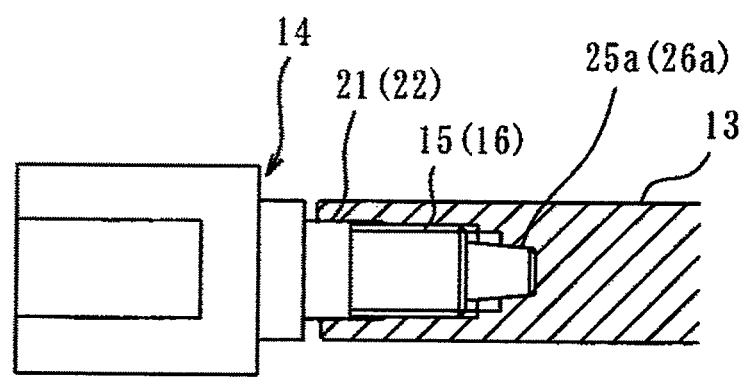
[FIG. 6B] A partial cross-sectional view illustrating a connected state of the shank and bit in yet another embodiment.

When the bit 14 is connected to the shank 13, the male screw portion 16 of the bit 14 is screwed into the female screw portion 15 of the shank 13 as illustrated in FIG. 6B. As the screwing proceeds, the base shaft portion 22 of the bit 14 is fitted to the short tubular portion 21 of the shank 13. Similarly, the tapered shaft-like portion 26a of the bit 14 is fitted to the concave portion 25a of the shank 13. In this manner, center alignment is carried out by means of the first guide part and the second guide part. Then, the tapered surface of the tapered shaft-like portion 26a is eventually fitted to and abutted against the concave portion 25a of the shank 13.

Also in the above-described embodiment, since the center alignment of the bit 14 is carried out by the first guide part and the second guide part, the accuracy of the center alignment is increased.

Figure 7A:
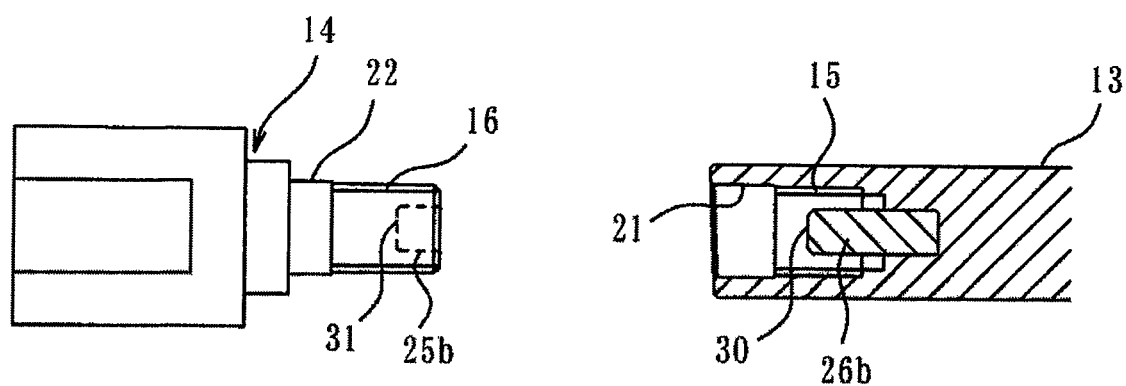
[FIG. 7A] A partial cross-sectional view illustrating the shank and main body shaft in even another embodiment.

Moreover, FIG. 7A also illustrates an embodiment in which the guide part for center alignment includes two guide parts. A first guide part includes: a short tubular portion 21 formed in front of the female screw portion 15 of the shank 13; and a base shaft portion 22 formed at a base of the male screw portion 16 of the bit 14. The short tubular portion 21 and the base shaft portion 22 are formed so as to be fitted to each other. The short tubular portion 21 is formed so that its center coincides with the axial center of the shank 13, and the base shaft portion 22 is formed so that its center coincides with the axial center of the bit 14.

Furthermore, a second guide part includes: a shaft-like portion 26b located at the center of the female screw portion 15 at a front end of the shank 13; and a concave portion 25b having a circular cross section and formed by an opening at a front end of the male screw portion 16 of the bit 14. The shaft-like portion 26b and the concave portion 25b are formed so as to be fitted to each other. The shaft-like portion 26b is formed so that its center coincides with the axial center of the shank 13, and the concave portion 25b is also formed so that its center coincides with the axial center of the bit 14.

Moreover, an abutting portion includes: a front end 30 of the shaft-like portion 26b of the shank 13; and a bottom face 31 of the concave portion 25b of the bit 14.

Figure 7B:
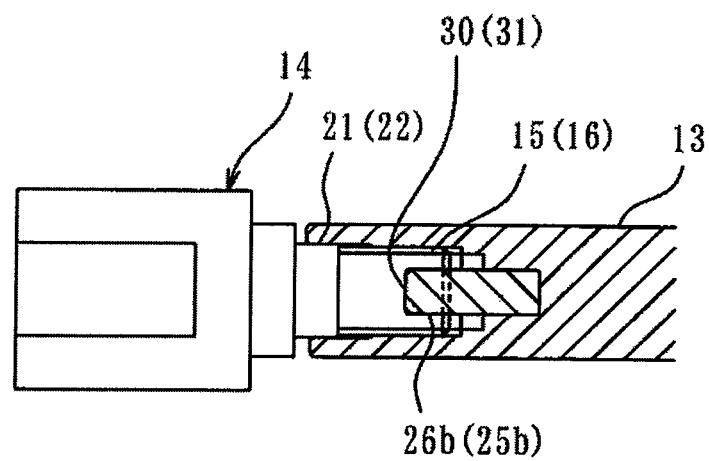
[FIG. 7B] A partial cross-sectional view illustrating a connected state of the shank and main body shaft in even another embodiment.

When the bit 14 is connected to the shank 13, the male screw portion 16 of the bit 14 is screwed into the female screw portion 15 of the shank 13 as illustrated in FIG. 7B. As the screwing proceeds, the base shaft portion 22 of the bit 14 is fitted to the short tubular portion 21 of the shank 13. Similarly, the concave portion 25b of the bit 14 is fitted to the shaft-like portion 26b of the shank 13. In this manner, center alignment is carried out by means of the first guide part and the second guide part. Then, the front end 30 of the shaft-like portion 26b is eventually abutted against the bottom face 31 of the concave portion 25b.

Also in the above-described embodiment, since the center alignment of the bit 14 is carried out by the first guide part and the second guide part, the accuracy of the center alignment is further increased.

Figure 8A:
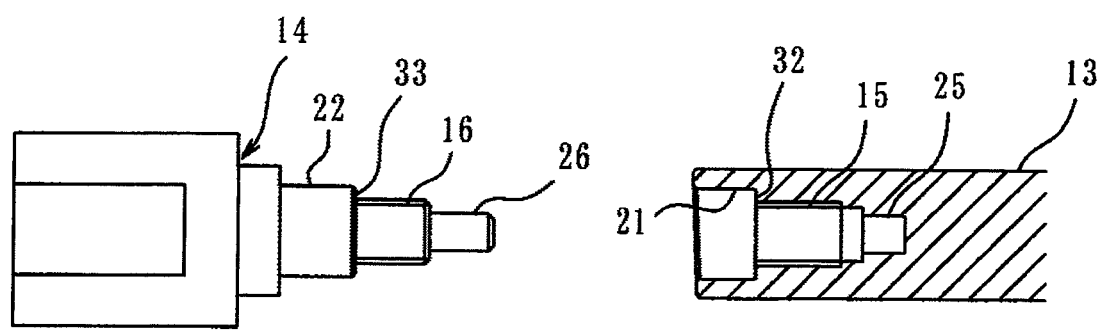
[FIG. 8A] A partial cross-sectional view illustrating the shank and main body shaft.
Figure 8B:
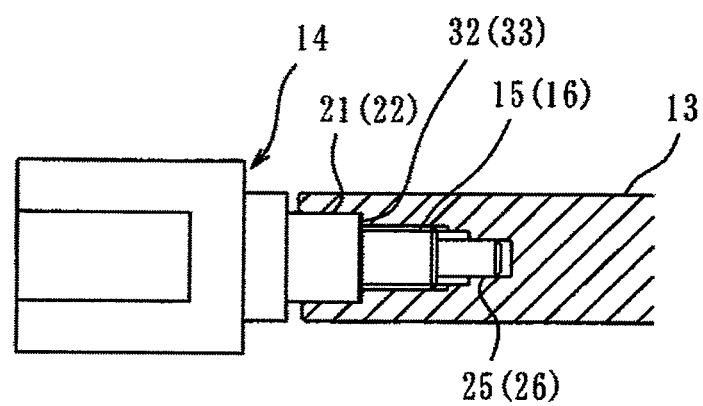
[FIG. 8B] A partial cross-sectional view illustrating a connected state of the shank and main body shaft.

Furthermore, FIG. 8A illustrates another embodiment of an abutting portion, in which a guide part structure is substantially similar to that illustrated in FIG. 2A, but the abutting portion includes: a step 32 between the female screw portion 15 and the short tubular portion 21 of the shank 13; and a step 33 between the male screw portion 16 and the base shaft portion 22 of the bit 14.

In the above-described structure, the male screw portion 16 of the bit 14 is screwed into the female screw portion 15 of the shank 13. As the screwing proceeds, the base shaft portion 22 of the bit 14 is fitted to the short tubular portion 21 of the shank 13. Similarly, the shaft-like portion 26 of the bit 14 is fitted to the concave portion 25 of the shank 13. Then, the step 33 between the male screw portion 16 and the base shaft portion 22 of the bit 14 is eventually abutted against the step 32 between the female screw portion 15 and the short tubular portion 21 of the shank 13.

Next, also as for the screw connection between the shank 13 and the main body shaft 5 of the tool main body 1, which serves as an example of a connection body, a guide part for center alignment for aligning centers (rotation centers) of the shank 13 and the main body shaft 5, and an abutting portion are formed in the vicinity of screw portions of the shank 13 and main body shaft 5. Further, also in this case, the shank and the main body shaft are formed in the similar manner as in the embodiment in which the shank 13 and the bit 14 are connected.

Figure 9A:
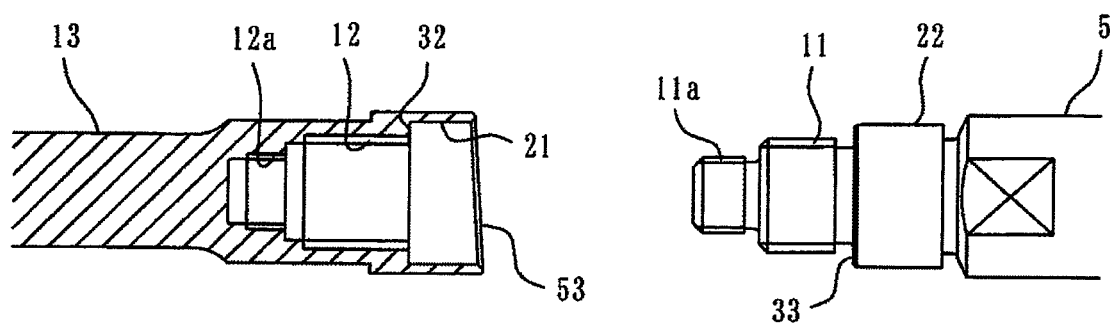
[FIG. 9A] A partial cross-sectional view illustrating the shank and main body shaft in another embodiment.

Specifically, as illustrated in FIG. 9A, a female screw portion 12, which can be connected via screws to a male screw portion 11 of the main body shaft 5 of the tool main body 1, is formed at a rear end of the shank 13. Further, the guide part for center alignment includes: a short tubular portion 21 having a circular cross section and formed behind the female screw portion 12 of the shank 13; and a base shaft portion 22 formed at a base of the male screw portion 11 of the main body shaft 5. The short tubular portion 21 and the base shaft portion 22 are formed so as to be fitted to each other. The short tubular portion 21 is formed so that its center coincides with the axial center of the shank 13, and the base shaft portion 22 is also formed so that its center coincides with the axial center of the main body shaft 5.

Furthermore, the abutting portion includes: a step 32 between the short tubular portion 21 and the female screw portion 12 of the shank 13; and a step 33 between the base shaft portion 22 and the male screw portion 11 of the main body shaft 5.

Figure 9B:
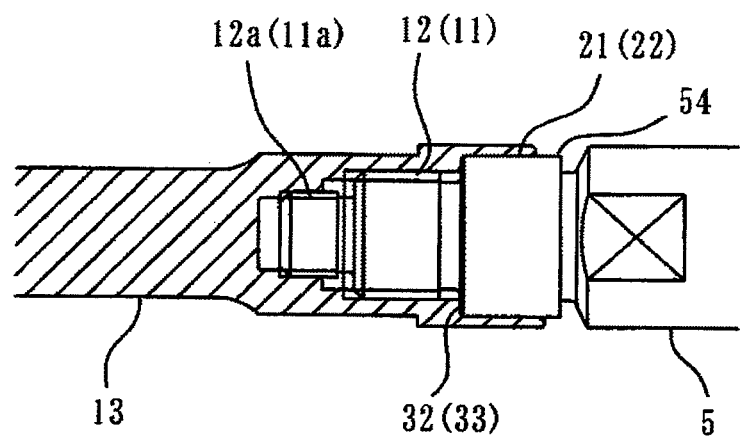
[FIG. 9B] A partial cross-sectional view illustrating a connected state of the shank and main body shaft in another embodiment.

Next, when the main body shaft 5 is connected to the shank 13, the male screw portion 11 of the main body shaft 5 is screwed into the female screw portion 12 of the shank 13 as illustrated in FIG. 9B. As the screwing proceeds, a second male screw portion 11a of the main body shaft 5 is screwed into a second female screw portion 12a of the shank 13, and the base shaft portion 22 of the main body shaft 5 is fitted to the short tubular portion 21 of the shank 13. Then, the step 33 of the main body shaft 5 is eventually abutted against the step 32 of the shank 12.

As described above, the base shaft portion 22 of the main body shaft 5 is fitted to the short tubular portion 21 of the shank 13, thereby carrying out center alignment; thus, even if the processing accuracy of the male screw portion 11 and second male screw portion 11a of the main body shaft 5 and the female screw portion 12 and second female screw portion 12a of the shank 13 is not high, the center alignment is enabled easily, reliably and accurately.

Further, an inclined plane 53 is provided at an end face of the shank 13, at which the shank 13 is connected to the main body shaft 5, thus forming an inclined gap 54 between the inclined plane 53 of the shank 13 and an end of the main body shaft 5 as illustrated in FIG. 9B when the shank 13 and the main body shaft 5 are connected to each other. Thus, concrete cuttings might get into a gap between the shank 13 and the main body shaft 5 during drilling. This makes it difficult to perform attachment/detachment of the shank 13 to/from the main body shaft 5 when the shank 13 is frequently replaced in performing operations, but the concrete cuttings can be spontaneously discharged to outside during rotation due to the shape of the inclined gap 54.

Then, the guide part for center alignment and the abutting portion are not limited to the above-described embodiment. Next, other embodiments will be described.

Figure 10A:
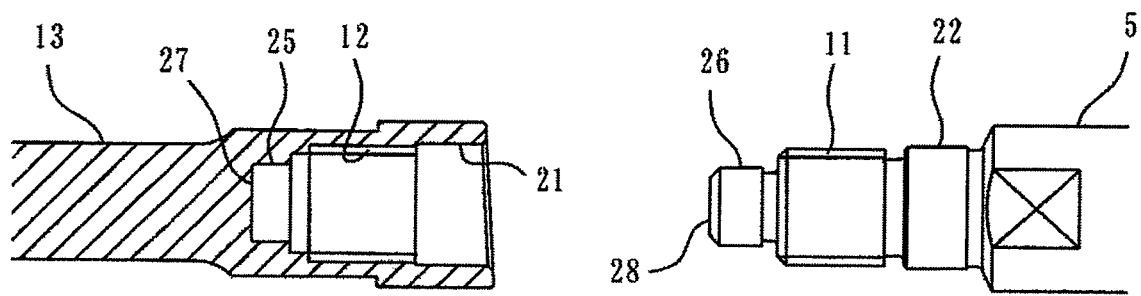
[FIG. 10A] A partial cross-sectional view illustrating the shank and main body shaft in still another embodiment.

In FIG. 10A, the guide part for center alignment includes two guide parts. Specifically, a first guide part includes: a short tubular portion 21 having a circular cross section and formed behind the female screw portion 12 of the shank 13; and a base shaft portion 22 formed at a base of the male screw portion 11 of the main body shaft 5. The short tubular portion 21 and the base shaft portion 22 are formed so as to be fitted to each other. The short tubular portion 21 is formed so that its center coincides with the axial center of the shank 13, and the base shaft portion 22 is also formed so that its center coincides with the axial center of the main body shaft 5.

Furthermore, a second guide part includes: a concave portion 25 having a circular cross section and formed at the center of a bottom face of the female screw portion 12 at a rear end of the shank 13; and a shaft-like portion 26 formed at a front end of the male screw portion 11 of the main body shaft 5. The concave portion 25 and the shaft-like portion 26 are formed so as to be fitted to each other. The concave portion 25 is formed so that its center coincides with the axial center of the shank 13, and the shaft-like portion 26 is also formed so that its center coincides with the axial center of the main body shaft 5.

Specifically, the female screw portion 12, the short tubular portion 21 and the concave portion 25 of the shank 13 are formed so as to be coaxial with the axial center of the shank 13, and the male screw portion 11, the base shaft portion 22 and the shaft-like portion 26 of the main body shaft 5 are formed so as to be coaxial with the axial center of the main body shaft 5.

Moreover, an abutting portion includes: a bottom face 27 of the concave portion 25 of the shank 13; and a front end 28 of the shaft-like portion 26 of the main body shaft 5.

Figure 10B:
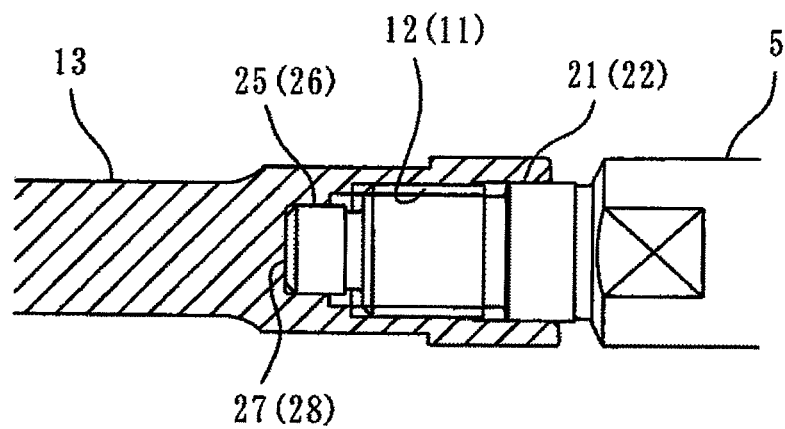
[FIG. 10B] A partial cross-sectional view illustrating a connected state of the shank and main body shaft in still another embodiment.

Next, when the main body shaft 5 is connected to the shank 13, the male screw portion 11 of the main body shaft 5 is screwed into the female screw portion 12 of the shank 13 as illustrated in FIG. 10B. As the screwing proceeds, the base shaft portion 22 of the main body shaft 5 is fitted to the short tubular portion 21 of the shank 13. Similarly, the shaft-like portion 26 of the main body shaft 5 is fitted to the concave portion 25 of the shank 13. In this manner, center alignment is carried out by means of the first guide part and the second guide part. Then, the front end 28 of the shaft-like portion 26 is eventually abutted against the bottom face 27 of the concave portion 25 of the shank 13.

As described above, the center alignment of the main body shaft 5 is carried out by the first guide part and the second guide part; thus, also in the above-described embodiment, the center alignment of the bit 14 is carried out by the first guide part and the second guide part, resulting in an increase in the accuracy of the center alignment.

It should be noted that since the main body shaft 5 is abutted against the shank 13 via the abutting portion, the depth of a screw connection is restricted, and screw tightening is appropriately kept; therefore, the screwing is prevented from proceeding more than necessary when the main body shaft 5 is relatively rotated with respect to the shank 13. The same goes for the following embodiments.

Figure 11A:
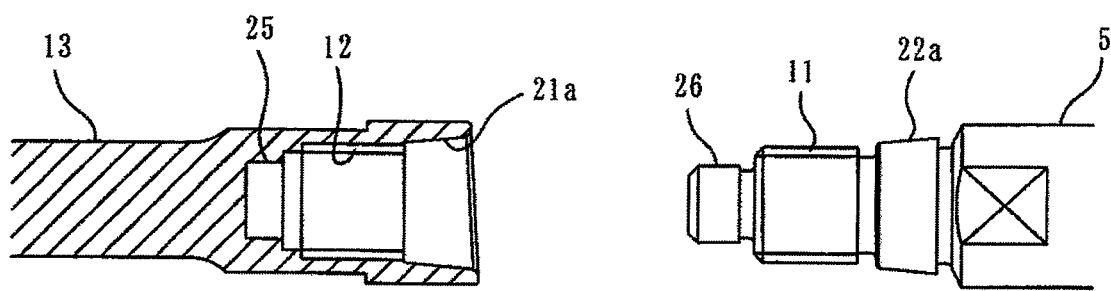
[FIG. 11A] A partial cross-sectional view illustrating the shank and main body shaft in yet another embodiment.
Figure 11B:
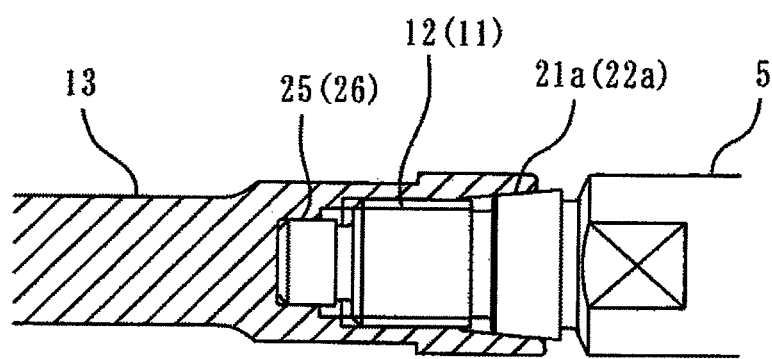
[FIG. 11B] A partial cross-sectional view illustrating a connected state of the shank and main body shaft in yet another embodiment.

Next, FIG. 11A also illustrates an embodiment in which the guide part for center alignment includes two guide parts, but a first guide part includes: a bowl-like short tubular portion 21a formed behind the female screw portion 12 of the shank 13; and a tapered base shaft portion 22a formed at a base of the male screw portion 11 of the main body shaft 5. The short tubular portion 21a and the base shaft portion 22a are formed so as to be fitted to each other. The short tubular portion 21a is formed so that its center coincides with the axial center of the shank 13, and the tapered base shaft portion 22a is formed so that its center coincides with the axial center of the main body shaft 5.

Furthermore, a second guide part includes: a concave portion 25 having a circular cross section and formed at the center of a bottom face of the female screw portion 12 at a rear end of the shank 13; and a shaft-like portion 26 formed at a front end of the male screw portion 11 of the main body shaft 5. The concave portion 25 and the shaft-like portion 26 are formed so as to be fitted to each other. The concave portion 25 is formed so that its center coincides with the axial center of the shank 13, and the shaft-like portion 26 is also formed so that its center coincides with the axial center of the main body shaft 5.

Moreover, an abutting portion includes: short tubular portion 21a of the shank 13; and the base shaft portion 22a of the main body shaft 5.

When the main body shaft 5 is connected to the shank 13, the male screw portion 11 of the main body shaft 5 is screwed into the female screw portion 12 of the shank 13. As the screwing proceeds, the tapered base shaft portion 22a of the main body shaft 5 is fitted to the short tubular portion 21a of the shank 13. Similarly, the shaft-like portion 26 of the main body shaft 5 is fitted to the concave portion 25 of the shank 13. In this manner, center alignment is carried out by means of the first guide part and the second guide part. Then, the tapered surface of the tapered base shaft portion 22a is eventually fitted to and abutted against the short tubular portion 21a of the shank 13.

Also in the above-described embodiment, effects similar to those of the foregoing embodiments can be obtained.

Figure 12A:
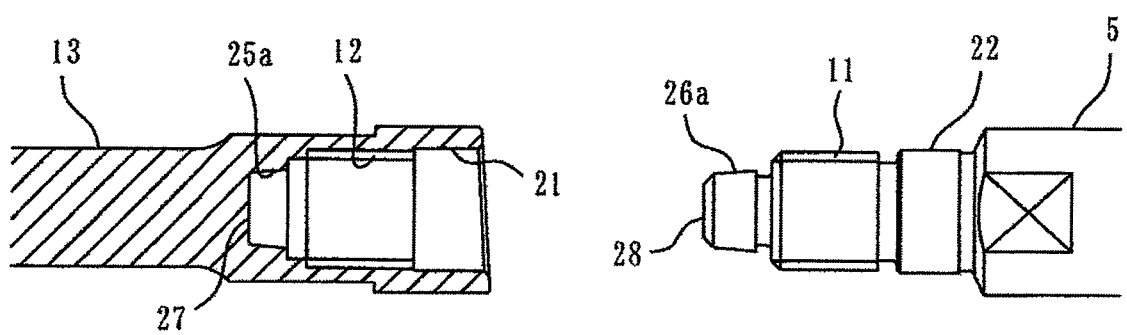
[FIG. 12A] A partial cross-sectional view illustrating the shank and main body shaft in even another embodiment.

Moreover, FIG. 12A also illustrates an embodiment in which the guide part for center alignment includes two guide parts. A first guide part includes: a short tubular portion 21 formed behind the female screw portion 12 of the shank 13; and a base shaft portion 22 formed at a base of the male screw portion 11 of the main body shaft 5. The short tubular portion 21 and the base shaft portion 22 are formed so as to be fitted to each other. The short tubular portion 21 is formed so that its center coincides with the axial center of the shank 13, and the base shaft portion 22 is formed so that its center coincides with the axial center of the main body shaft 5.

Furthermore, a second guide part includes: a bowl-like concave portion 25a formed at the center of a bottom face of the female screw portion 12 at a rear end of the shank 13; and a tapered shaft-like portion 26a formed at a front end of the male screw portion 11 of the main body shaft 5. The concave portion 25a and the tapered shaft-like portion 26a are formed so as to be fitted to each other. The concave portion 25a is formed so that its center coincides with the axial center of the shank 13, and the shaft-like portion 26a is also formed so that its center coincides with the axial center of the main body shaft 5.

Moreover, an abutting portion includes: a bottom face 27 of the concave portion 25a of the shank 13; and a front end 28 of the shaft-like portion 26a of the main body shaft 5.

Figure 12B:
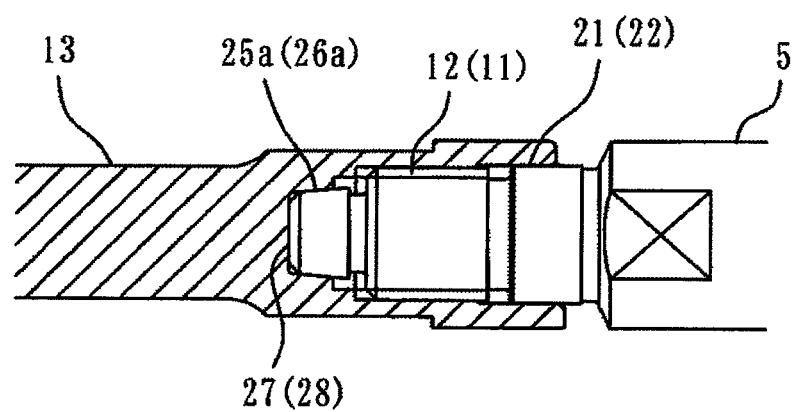
[FIG. 12B] A partial cross-sectional view illustrating a connected state of the shank and main body shaft in even another embodiment.

When the main body shaft 5 is connected to the shank 13, the male screw portion 11 of the main body shaft 5 is screwed into the female screw portion 12 of the shank 13 as illustrated in FIG. 12B. As the screwing proceeds, the base shaft portion 22 of the main body shaft 5 is fitted to the short tubular portion 21 of the shank 13. Similarly, the tapered shaft-like portion 26a of the main body shaft 5 is fitted to the concave portion 25a of the shank 13. In this manner, center alignment is carried out by means of the first guide part and the second guide part. Then, the tapered surface of the tapered shaft-like portion 26a of the main body shaft 5 is eventually fitted to and abutted against the concave potion 25a of the shank 13.

Also in the above-described embodiment, effects similar to those of the foregoing embodiments can be obtained.

Figure 13A:
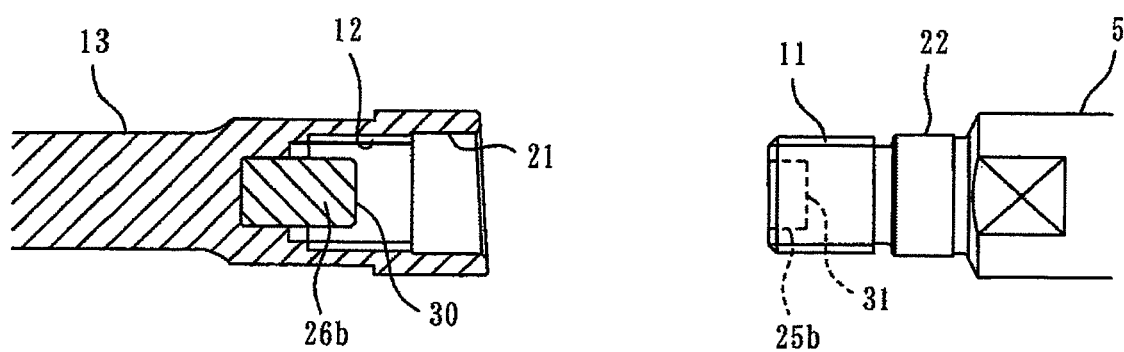
[FIG. 13A] A partial cross-sectional view illustrating the shank and main body shaft in still yet another embodiment.

Moreover, FIG. 13A also illustrates an embodiment in which the guide part for center alignment includes two guide parts. A first guide part includes: a short tubular portion 21 formed behind the female screw portion 12 of the shank 13; and a base shaft portion 22 formed at a base of the male screw portion 11 of the main body shaft 5. The short tubular portion 21 and the base shaft portion 22 are formed so as to be fitted to each other. The short tubular portion 21 is formed so that its center coincides with the axial center of the shank 13, and the base shaft portion 22 is formed so that its center coincides with the axial center of the main body shaft 5.

Furthermore, a second guide part includes: a shaft-like portion 26b located at the center of the female screw portion 12 at a rear end of the shank 13; and a concave portion 25b having a circular cross section and formed by an opening at a front end of the male screw portion 11 of the main body shaft 5. The shaft-like portion 26b and the concave portion 25b are formed so as to be fitted to each other. The shaft-like portion 26b is formed so that its center coincides with the axial center of the shank 13, and the concave portion 25b is also formed so that its center coincides with the axial center of the main body shaft 5.

Moreover, an abutting portion includes: a front end 30 of the shaft-like portion 26b of the shank 13; and a bottom face 31 of the concave portion 25b of the main body shaft 5.

Figure 13B:
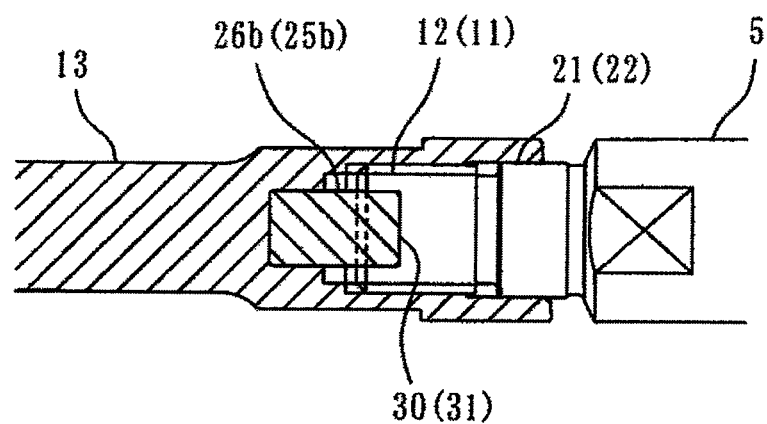
[FIG. 13B] A partial cross-sectional view illustrating a connected state of the shank and main body shaft in still yet another embodiment.

When the main body shaft 5 is connected to the shank 13, the male screw portion 11 of the main body shaft 5 is screwed into the female screw portion 12 of the shank 13 as illustrated in FIG. 13B. As the screwing proceeds, the base shaft portion 22 of the main body shaft 5 is fitted to the short tubular portion 21 of the shank 13. Similarly, the concave portion 25b of the main body shaft 5 is fitted to the shaft-like portion 26b of the shank 13. In this manner, center alignment is carried out by means of the first guide part and the second guide part. Then, the front end 30 of the shaft-like portion 26b is eventually abutted against the bottom face 31 of the concave portion 25b.

Also in the above-described embodiment, effects similar to those of the foregoing embodiments can be obtained.

Figure 14A:
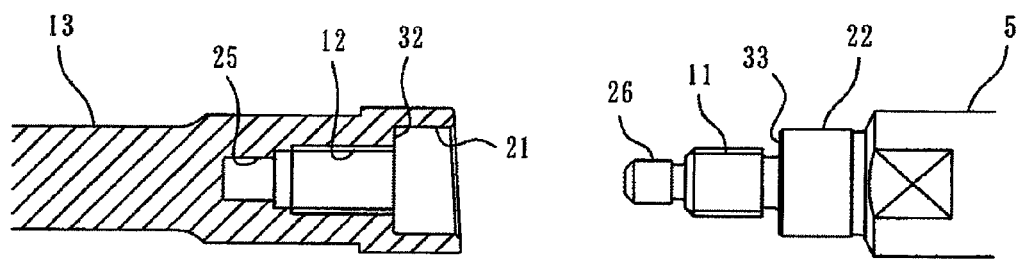
[FIG. 14A] A partial cross-sectional view illustrating the shank and main body shaft in even still another embodiment.
Figure 14B:
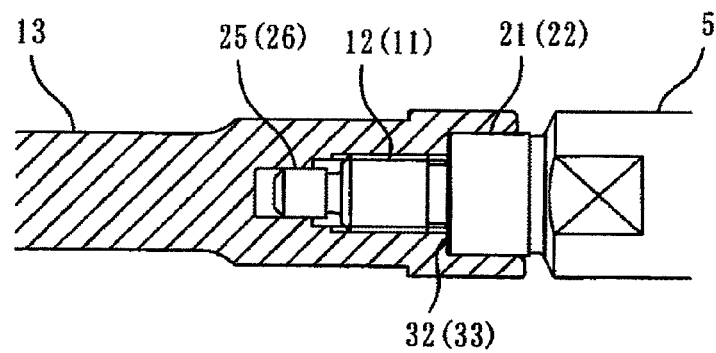
[FIG. 14B] A partial cross-sectional view illustrating a connected state of the shank and main body shaft in even still another embodiment.

Furthermore, FIG. 14A illustrates another embodiment of an abutting portion, in which a guide part structure is substantially similar to that described in the foregoing embodiments, but the abutting portion includes: a step 32 between the female screw portion 12 and the short tubular portion 21 of the shank 13; and a step 33 between the male screw portion 11 and the base shaft portion 22 of the main body shaft 5.

In the above-described structure, the male screw portion 11 of the main body shaft 5 is screwed into the female screw portion 12 of the shank 13. As the screwing proceeds, the base shaft portion 22 of the main body shaft 5 is fitted to the short tubular portion 21 of the shank 13. Similarly, the shaft-like portion 26 of the main body shaft 5 is fitted to the concave portion 25 of the shank 13. Then, the step 33 between the male screw portion 11 and the base shaft portion 22 of the main body shaft 5 is eventually abutted against the step 32 between the female screw portion 12 and the short tubular portion 21 of the shank 13.

It should be noted that in each of the foregoing embodiments, the bit 14 or main body shaft 5, serving as a connection body, is directly connected via screws to the shank 13, but there may be provided a structure in which they are connected to each other via an adaptor serving as another connection body.

For example, when the bit 14 is connected to the shank 13 via an adaptor as illustrated in FIGS. 15A and 15B, there may be provided a structure in which an adaptor 35 and the shank 13 are connected to each other via a screw connection (male screw portion 16a and female screw portion 15) provided with: a guide part (base shaft portion 36, short tubular portion 21, shaft-like portion 37, and concave portion 25); and an abutting portion (front end 28 and bottom face 38), and the adaptor 35 and the bit 14 are connected to each other via a conventional screw connection (male screw portion 16 and female screw portion 15a). In addition, an inclined plane may be provided at a surface of the adaptor, at which it is connected to the bit.

Figure 16A:
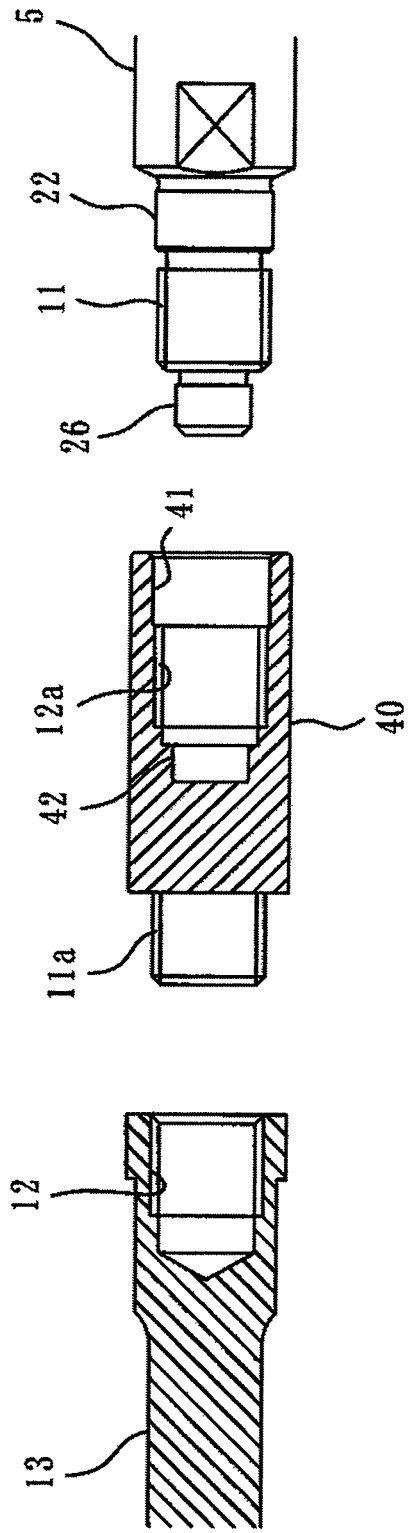
[FIG. 16A] A partial cross section illustrating the shank, adaptor and main body shaft.
Figure 16B:
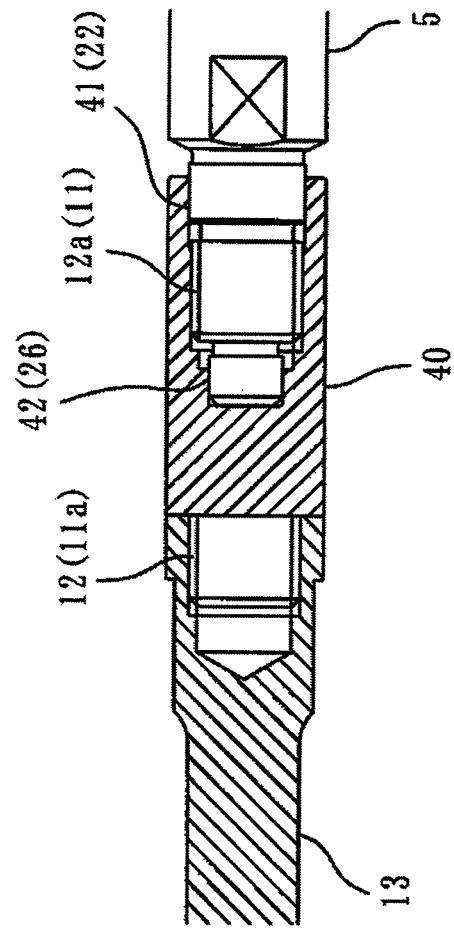
[FIG. 16B] A partial cross section illustrating a connected state of the shank, adaptor and main body shaft.

Furthermore, when the shank 13 is connected to the main body shaft 5 via an adaptor as illustrated in FIG. 16A and 16B, there may be provided a structure in which an adaptor 40 and the main body shaft 5 are connected to each other via a screw connection (male screw portion 11 and female screw portion 12a) provided with: a guide part (base shaft portion 22, short tubular portion 41, shaft-like portion 26, and concave portion 42); and an abutting portion (front end 28 and bottom face 43), and the adaptor and the shank 13 are connected to each other via a conventional screw connection (male screw portion 11a and a female screw portion 12). In addition, an inclined plane may be provided at an end face of the adaptor, which is located adjacent to the main body shaft.

Naturally, the center alignment of the adaptor 35 and the bit 14 illustrated in FIG. 15A and FIG. 15B, and the center alignment of the adaptor 40 and the shank 13 illustrated in FIGS. 16A and 16B may be carried out by means of the guide part, but the structure of the guide part is not limited to the illustrated structures.

Although the present invention has been described in detail with reference to particular embodiments, it is apparent to those skilled in the art that various changes and modifications may be made without departing from the spirit and scope of the present invention.

The present application is based on Japanese Patent Application (Japanese Patent Application No. 2007-231293) filed on Sep. 6, 2007, the contents of which are hereby incorporated by reference.

Industrial Applicability

A shank and a connection body are connected to each other via screws, and a guide part for center alignment for aligning the centers of the shank and connection body is formed in the vicinity of screw portions of the shank and connection body; thus, even if the processing accuracy of the screw portions of the connection body and shank is not high, the center alignment is enabled easily, reliably and accurately. Accordingly, perpendicularity, which has conventionally been provided at an abutting end face, does not have to be provided.

The invention claimed is:

1. A drilling tool comprising:
a tool main body;
a shank extending along a longitudinal axis located at a tip side of the tool main body; and
a connection body located at a tip side of the shank,
wherein the shank and the connection body are connected via screw portions of the shank and the connection body,
wherein a guide part for aligning centers of the shank and the connection body along the longitudinal axis is formed in the vicinity of the screw portions of the shank and the connection body,
wherein the guide part includes a tubular portion formed in front of a female screw portion of the shank and a base shaft portion formed at a base of a male screw portion of the connection body, and
wherein a distal-most end face of the shank facing the connection body is formed as an inclined plane that is inclined with respect to the longitudinal axis and forms an inclined gap between the distal-most end face of the shank and an end face of the connection body, the inclined gap being wider on one side of the longitudinal axis than on an opposite side of the longitudinal axis by the distal-most end face of the shank being formed as the inclined plane, the inclined gap extends radially outward from the guide part to the outermost surface of the shank and the connection body to discharge cuttings during rotation of the shank and the connection body.

2. The drilling tool according to claim 1, wherein the connection body is a bit.

3. The drilling tool according to claim 1, wherein the connection body is a main body shaft.

4. The drilling tool according to claim 1, wherein the connection body is an adaptor.

5. The drilling tool according to claim 4, wherein a distal-most end face of the adaptor which is connected to a bit is inclined with respect to the longitudinal axis.

6. The drilling tool according to claim 4, wherein a distal-most end face of the adaptor facing the main body shaft is inclined with respect to the longitudinal axis.

7. The drilling tool according to claim 1, wherein the guide part comprises a fitting portion and a fitted portion, which are axially fitted to each other.

8. The drilling tool according to claim 1, wherein a plurality of the guide parts are formed.

9. The drilling tool according to claim 1, wherein an abutting portion for restriction a depth of a screw connection is formed in the guide part.

10. The drilling tool according to claim 1, wherein a distal-most end face of the shank facing a main body shaft is inclined with respect to the longitudinal axis.

11. The drilling tool according to claim 1, wherein the inclined gap is open outwardly from the guide part in a radial direction so as not to form an enclosed space.

* * * * *